United States Patent [19]

Mader

[11] Patent Number: 4,823,295

[45] Date of Patent: Apr. 18, 1989

[54] HIGH SPEED SIGNAL PROCESSOR

[75] Inventor: James M. Mader, Indialantic, Fla.

[73] Assignee: Harris Corp., Melbourne, Fla.

[21] Appl. No.: 929,057

[22] Filed: Nov. 10, 1986

[51] Int. Cl.$^4$ ................................................ G06F 7/38
[52] U.S. Cl. ..................................... 364/716; 364/726
[58] Field of Search ........................ 364/726, 716, 715

[56] References Cited

U.S. PATENT DOCUMENTS 4,328,555  5/1982  Nussbaumer .......................... 364/726
4,547,862  10/1985  McIver et al. ....................... 364/726

FOREIGN PATENT DOCUMENTS 2171231  8/1986  United Kingdom ................ 364/716

Primary Examiner—Gary V. Harkcom
Assistant Examiner—Tan V. Mai
Attorney, Agent, or Firm—Antonelli, Terry & Wands

[57] ABSTRACT

A high speed signal processor contains a set of repetitive architecture functional units including an input data storage unit for storing quantized data values, a data shifting unit, an output data accumulator and a control code generator. The data shifting unit is coupled in parallel to each of a plurality of controllable data accumulator sections of the output data accumulator. Each accumulator section has a control input coupled to a respective output of the control data generator for defining the logic operation of the data accumulator section with respect to the contents of the data shifting unit. The data shifting unit has a plurality of stages each of which is coupled in parallel to the output stage of successive stages of the input data storage unit to which successive digitized data samples of a signal waveform to be processed are coupled. As each respective data sample is coupled to the data shifting unit, the contents of the data shifting unit are incrementally shifted and the resulting digital value is coupled in parallel to each of the sections of the output data accumulator. For each shifted value the parallel arrangement of data accumulator sections controllably combine the contents of the data shifting unit with the current data value stored in each accumulator section in accordance with control codes supplied from the programmable control signal generator.

30 Claims, 1 Drawing Sheet

HIGH SPEED SIGNAL PROCESSOR

FIELD OF THE INVENTION

The present invention relates in general to signal processing systems and is particularly directed to a signal processing architecture that is capable of executing computationally complex functions using parallel, high speed repetitive digital circuit components that are particularly suited to hardware reduction via wafer scale integration techniques.

BACKGROUND OF THE INVENTION

The continuing evolution of complex data/signal analysis/processing requirements in industrial, scientific and military environments has been accompanied by a demand for an increase in data/signal processing capacity, speed and integration density of microelectronic implementations of the processing hardware. To handle the enormous variety of processing algorithms, the programmable microprocessor has been typically employed as the principal signal processing mechanism. While the microprocessor approach, because of programmability and memory expansion capability, offers flexibility in its application to essentially any degree of signal processing complexity, its architecture and operation impart speed constraints on its practical use in highly dynamic signal processing environments such as sophisticated avionics and weapons delivery systems of state of the art military aircraft.

One proposal for circumventing the performance limitations of conventional microprocessor architectures has been to use a custom signal processor configured to implement a specific signal processing algorithm. One such algorithm that has been found to be especially attractive in the dynamic signal processing environment is the Fast Fourier Transform (FFT). Computational execution of the FFT is typically accomplished through the use of a very large multiplier-adder matrix which, when mapped into a semiconductor architecture, requires a considerable wafer occupation area. Because signal processing applications of the type mentioned above are practically realizable only through the use of parallel processor architectures, the final processor configuration becomes both costly and cumbersome to implement.

SUMMARY OF THE INVENTION

In accordance with the present invention the signal processing speed limitations of conventional general purpose microprocessor architectures (particularly in the context of handling large numbers of digitized data samples of analog signals) and the wafer scale integration shortcomings of conventional custom designed, computationally intensive special purpose architectures (e.g. FFT signal processors) are circumvented by a new and improved signal processor which employs a combination of wafer scale-repetitive building blocks, functionally integrated to provide enhanced signal processing speeds for implementing complex (e.g. multiple-multiplier capability) signal analysis/digital processing operations.

For this purpose, the present invention employs, as its principal signal processing operator, a data shifting unit coupled in parallel to each of a plurality of controllable data accumulator sections that make up an output data accumulator. Each accumulator section has a control input coupled to the output of a respective programmable control signal generator (e.g. read only memory) for defining the logic operation of the data accumulator section with respect to the contents of the data shifting unit. The data shifting unit comprises a plurality of stages each of which is adapted to be coupled in parallel to the output stage of successive stages of an input data storage unit to which successive digitized data samples of a signal waveform to be processed may be coupled. As each respective data sample is coupled to the data shifting unit, the contents of the data shifting unit are incrementally shifted and the resulting digital value is coupled in parallel to each of the controllable data accumulator sections of the output data accumulator. For each shifted value the parallel arrangement of data accumulator sections controllably combine (add/subtract) the contents of the data shifting unit with the current data value stored in each accumulator section, in accordance with control signals supplied from the programmable control signal generator. This controlled shift and add (subtract) operation effectively implements a controlled multiplication operation of the current data sample with respect to each of the plurality of logic operator control signals coupled to the parallel-coupled accumulator sections of the output data accumulator.

As a result, upon completion of the controlled shift and parallel add/accumulate operation for each of the successive data samples of a digitized signal waveform, there is stored in the output data accumulator an effective correlation of the signal waveform with a prescribed control function that has been programmed into the control signal generator. Where the respective control signal generators are configured (programmed) to generate respective digital codes representative of reference waveforms (e.g. sinusoidal patterns of successively differing frequencies), the accumulated values stored in the respective sections of the output data accumulator effectively equate to discrete Fourier transform (DFT) processing of the input signal waveform. By virtue of the parallel coupling of the accumulator sections of the output data accumulator to the data shifting unit, the effective computation speed realized exceeds that obtained through the multiplier-adder intensive structure and electronically-massive Fast Fourier Transform processor, the integration of which through wafer scale processing is presently practically unrealizable.

Contrasted therewith, however, the respective building blocks of the signal processor the the present invention are, for the most part, implementable using repetitive, low logic complexity, digital logic circuit components that are readily mapped into a microelectronic architecture using wafer scale integration techniques. Consequently, the signal processing architecture of the present invention is both processing intensive (carrying out complex signal processing operations at considerably higher speeds than conventional repetitious algorithms executed in general purpose microprocessor architectures) and semiconductor reducible through wafer scale integration methodologies.

DETAILED DESCRIPTION

Figure 1:
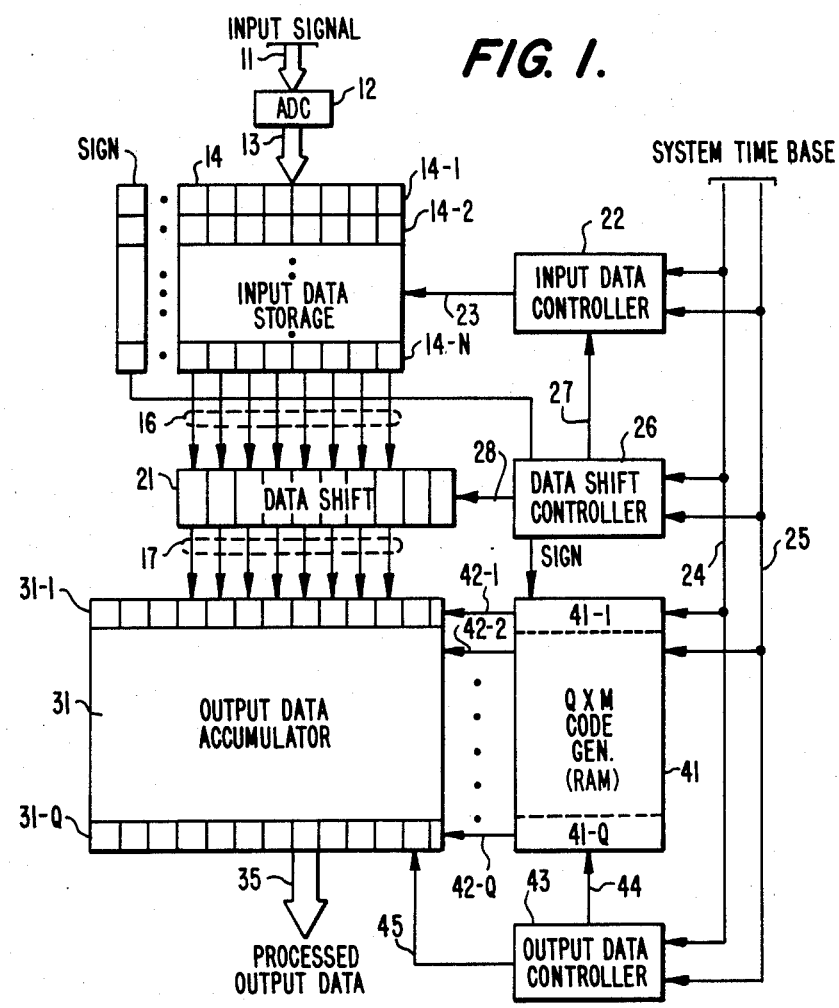
FIG. 1 is a diagrammatic illustration of a high speed signal processor in accordance with the present invention.

Before describing, in detail, the particular improved signal processing scheme in accordance with the present invention, it should be observed that the invention resides primarily in a novel structural combination of conventional signal processing circuits and not in the particular detailed configurations thereof. Accordingly, the structure, control and arrangement of such circuits have been illustrated in the Drawings by a readily understandable block diagram representation, which illustrates only those specific details that are pertinent to the present invention, so as not to obscure the disclosure with structural details which will be readily apparent to those skilled in the art having the benefit of the description therein. In addition, various control links have been consolidated and simplified in order to emphasis those portions that are most pertinent to the present invention. Thus, the block diagram illustration is primarily intended to illustrate the major structural components of the system their repetitive architectural grouping, whereby the present invention may be more readily understood.

Referring now to FIG. 1 of the Drawings, a diagrammatical illustration of a high speed signal processor having repetitive architecture characteristics in accordance with the present invention is shown. By possessing architectural characteristics that are repetitive, the present invention is configurable or reducible in semiconductor form employing semiconductor logic circuit devices that are capable of being implemented using wafer scale integration techniques (i.e. low logic complexity and therefore high inherent yield). For a description of a methodology that is particularly suited for optimizing the architectural configuration of high complexity integrated circuit structures, attention may directed to my copending application Ser. No. 709,138 filed Mar. 7, 1985, entitled "Integrated Circuit Architecture Formed Of Parametric Macro-Cells", now U.S. Pat. No. 4,701,860 issued Oct. 20, 1987, and assigned to the Assignee of the present application. It should be observed, however, that the repetitive nature of the present invention is not limited exclusively to the implementation techniques described in the above-referenced application; that application is referenced simply to provide background material and an explanation of a wafer scale processing methodology through which the repetitive characteristics of the invention may be reduced to semiconductor structure.

Referring to FIG. 1, an analog signal to be processed (such as a monopulse radar return derived from an aircraft's phased array antenna, a voice signal to be analyzed in terms of its spectral content, etc.) is coupled over an input link 11 to an analog-digital converter (ADC) 12, which samples the analog signal waveform and provides a prescribed quantization resolution sample sequence over an output link 13 to an input data storage unit 14. It should be noted that input data storage unit 14 is not an essential component for implementing the present invention. It is included here simply to illustrate its incorporation into an exemplary embodiment of the invention. For purposes of the present description, it will be assumed that the analog signal is a voice signal whose quantization resolution is comprised of 8 bits (a sign bit and 7 magnitude bits). (For a radar return that may be imaged on an aircraft's cockpit display (512×512 pixel display), the signal over link 11 may represent a single line of data.) Input data storage unit 14 is comprised of N cascaded register stages 14-1 ... 14-N to which the successive signals for each line of data are successively derived from A-D converter 12.

Each register stage 14-i of input data storage unit 14 is comprised of a set of identical (wafer scale-repetitive architecture) individual storage elements the respective bit positions of which are cascaded in parallel so that the quantized value supplied from analog-to-digital converter 12 may be clocked from stage-to-stage in sequence under control of a stepping clock signal on line 23 provided at the output of an input data controller 22. Input data controller 22 is configured of combinational logic which receives a reset signal on line 24 and a system clock signal on line 25 and provides stepping clock signals on link 23 for successively transferring the sample data values at the output of A-D converter 12 through the respective stages 14-i of input data storage unit 14.

The $N^{th}$ stage of input data storage unit 14 has its respective bit storage cells coupled over parallel data links 16 to a shift register 21. Shift register 21 operates to successively shift the magnitude bits of each successive data sample serially through the successive stages thereof under the control of a shift control signal on link 28 from a data shift controller 26. (The sign bit is not shifted. It may be coupled to code generator 41, to be described below, to be combined with the sign bit of the control codes thereof (as by exclusive-ORing)). Data shift controller 26, like input data controller 22, is comprised of combinational logic and operates off the reset and clock signals on links 24 and 25, respectively supplied from the system time base. Data shift controller 26 also supplies a control signal on link 27 to input data controller 22 for controlling the downloading of the contents of stage 14-N of input data storage unit 14 to shift register 21.

The respective magnitude bit stages of shift register 21 are coupled over parallel links 17 to each individual bit stage of a plurality of cascaded add/subtract accumulator cells of cascaded accumulator stages 31-1 ... 31-Q that make up an output data accumulator 31. Each respective add/subtract accumulator stage 31-i is coupled to a respective one of a plurality of control links 42-1 ... 42-Q of a (QXM) function generator 41. Function generator 41 may comprise, for example, a plurality of controllably loadable or programmable memory stages (e.g. random access memory stages) 41-1 ... 41-Q the contents of which are successively accessed under the control of a clock signal on link 25 and an address counter control signal supplied over link 44 from an output data controller 43. Output data controller 43, like data controllers 22 and 26 is comprised of combinational logic for generating successively address control signals for accessing the contents of respective stages 41-1 ... 41-Q of functional generator 41. For purposes of the present example, it will be assumed that each stage 41-i of function generator 41 is comprised of a random access memory, the contents of which are controllably loaded or programmed in accordance with respective control functions and are accessed by address signals over link 44 from output data controller 43, as mentioned above. Output data controller 43 also couples a signal over link 45 for controlling the transfer of the contents of the respective stages 31-1 ... 31-Q of output data accumulator 31 over parallel links 35 to a downstream utilization circuit (not shown).

The capacity of each add/subtract accumulator stage 31-i is sufficient to accommodate the maximum signal value capacity of the respective data samples that are coupled to shift register 21 from input data storage unit 14.

By virtue of the parallel connection of the respective contents of shift register 21 to each bit cell of a respective add/subtract accumulator stage 31-i, there is effectively obtained a digital multiplier, which multiplies the quantized data value, coupled over parallel links 16 to shift register 21, by the digital code supplied over link 42-i from function generator 41. Namely, shift register 21 and output data accumulator 31 are capable of executing a conventional shift and add digital multiplication operation. The M bit digital code supplied over a respective link 42-i controls whether or not the contents of an accumulator stage 31-i is to remain uneffected or is to be increased (decreased) by the shifted contents of shift register 21. Because shift register 21 is connected in parallel to a plurality of stages 31-1 ... 31-Q of output data accumulator 31, the multiplication function for an individual data sample may be carried out simultaneously with respect to each of a plurality of function generator codes supplied over links 42-1 ... 42-Q from code generator 41, thereby considerably increasing multiplication processing speeds as compared with conventional microprocessor multiplication loops. Moreover, as the architecture of output data accumulator 31 is repetitive (a matrix structure), having parallel interconnect lines, output data accumulator 31 readily lends itself to wafer scale integration.

Figure 2:
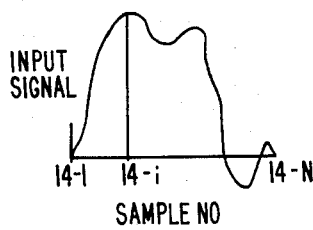
FIG. 2 illustrates an example of a signal waveform to be processed by the signal processor of FIG. 1.
Figure 3:
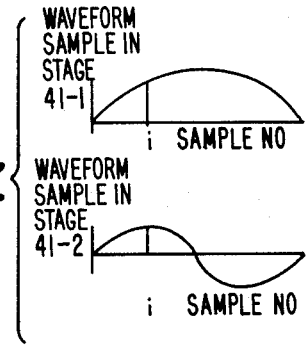
FIG. 3 shows a pair of control signal waveforms produced by respective stages of function signal generator 41 of the signal processor of FIG. 1.

As an illustration of an application of the present invention to a typical signal processing exercise, consider the present example of a sequence of samples of an analog voice signal stored in successive register stages 14-1 ... 14-N of input data storage unit 14. In the example given, a spectrum analysis of the contents of each individual sequence of data may be carried out by executing a discrete Fourier transform. For this purpose, the respective stages of function generator 41 may be allocated to different frequency bins and contain digital copies of sinusoidal waveform associated with each bin. An example of the input waveform itself is illustrated in FIG. 2, while FIG. 3 shows waveform samples that are stored in memory stages 41-1 and 41-2 of function generator 41.

To execute the discrete Fourier transform, successive samples of the input signal (shown in FIG. 2) are multiplied by each respective sinusoidal frequency component provided over the respective output links 42-1 ... 42-Q of function generator 41. To provide for a one-for-one correspondence of sample points of the input voice signal with an equal number of frequency bins, function generator 41 may comprise $Q=N$ respective function generating stages. For an arbitrary sample i, the quantized code value supplied over link 16 to shift register 21 is multiplied by the corresponding quantized value of the waveform stored in each of stages 41-1 ... 41-N of function generator 41. In the course of execution of this multiplication function, as each quantized sample value is coupled to shift register 21, it is then successively shifted under the control of shift control signal on link 28 from data shift controller 26. Assuming a shift to the right operation, the value of the bit at a respective bit position for the code supplied over line 42-i corresponding to the number of shifts that have been imparted via control link 28 to shift register 21 will control whether or not the contents of accumulator stage 31-i are to be incremented by the value of the data word stored in shift register 21 or are to be left unchanged, in accordance with conventional digital shift and add multiplication processing.

At the completion of the shifting out of the contents of the shift register 21 for an individual data sample, the next data sample is downloaded from input data storage unit 14 into shift register 21 and the contents of respective stages 14-i are transferred to the next successive stage 14-i+1. This process is repeated until all N-samples stored in input data storage unit 14 have been processed. At this point, the contents of the respective stages 31-i of output data accumulator 31 effectively represent the processing of an entire sequence of voice samples through the use of a discrete Fourier transform operator (stored in function generator 41). These accumulated values are then downloaded to downstream circuitry under the control of a downloading signal on link 45 from output data controller 43.

In the foregoing description of an example of the application of the present invention to executing a discrete Fourier transform operation with respect to an input voice signals, the configuration of the (programmable) function generator 41 was described as a plurality of random access memory stages. It should be observed, however, that the configuration of generator 41 is not limited to such memory elements, but may be implemented from other hardware functional blocks. Advantageously, however, the memory stages of function generator are presettable, thereby permitting the function generator to be simply programmed to execute any desired set of control operators for governing the action of add/subtract accumulator stages 31-i of output data accumulator 31.

Moreover, where signal processing requirements do not require use of the full resolution capacity of the signal processing components, signal processing speed may be improved. For example, in some applications the useful information may be contained in only two or three bits of the quantized data sample. In this instance, the number of shift and add operations executed by data shift controller 26 and data output controller 43 may be confined to only that two or three bit resolution before the next data sample is downloaded from stage 14-N to shift register 21 for processing.

As will be appreciated from the foregoing description, the signal processing speed limitations of conventional general purpose microprocessor architectures, particularly in the context of handling large numbers of digitized data samples of analog signals, and the wafer scale integration shortcomings of conventional custom designed, computationally intensive special purpose architectures are circumvented by the signal processor of the present invention which employs a combination of wafer scale-repetitive building blocks, functionally integrated to provide enhanced signal processing speeds for implementing complex (e.g. multiple-multiplier capability) signal analysis/digital processing operations. The respective building blocks of the signal processor of the present invention are, for the most part, implementable using repetitive digital logic circuit components that are readily mapped into a microelectronic architecture using wafer scale processing. Consequently, the signal processing architecture of the present invention is both processing intensive (carrying out complex signal processing operations at considerably higher speeds than conventional repetitious algorithms executed in general purpose microprocessor architectures) and semiconductor reducible through wafer scale integration methodologies.

While I have shown and described an embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed:

1. An apparatus for carrying out a prescribed signal processing operation on input signals respective values of which are provided in digitally encoded format as multibit digital signal codes comprising:

first means, coupled to receive said multibit digital signal codes, for controllably shifting respective ones of the codes by a controllable number of bits and providing the resulting shifted multibit codes over respective bit lines of a multibit output link;

second means for generating a plurality of signal processing operation control codes over respective ones of a plurality of control code output lines; and third means, coupled to the multibit output link of said first means and to said plurality of control code output lines of said second means, for generating a plurality of digital output codes in accordance with a relationship between the contents of the respective ones of said signal processing operation control codes and shifted multibit digital codes provided over said multibit output link.

2. An apparatus according to claim 1, wherein said first means includes means for storing, successively, respective ones of said multibit digital signal codes and controllably shifting each respective code successively by said controllable number of bits and providing the code resulting from each successive shift to said multibit output link.

3. An apparatus according to claim 2, wherein said third means comprises an array of repetitively configured controllable signal combining elements each of which is coupled to one of the respective bit lines of said multibit output link and is coupled to receive one of the signal processing operation control codes generated by said second means.

4. An apparatus according to claim 3, wherein said array of repetitively configured controllable signal combining elements comprises a matrix of elements respective rows of which are coupled to respective ones of said plurality of control code output lines and respective columns of which are coupled to respective bit lines of said multibit output link.

5. An apparatus according to claim 4, wherein each of said controllable signal combining elements comprises a controllable accumulator which controllably accumulates the data value of the bit line coupled thereto from said multibit output link in accordance with the data value of a prescribed portion of the control code coupled thereto over a respective one of said control code output lines.

6. An apparatus according to claim 5, wherein respective ones of said signal processing control codes are representative of quantized values of successive portions of a plurality of time varying signals.

7. An apparatus according to claim 5, wherein respective ones of signal processing codes are representative of quantized values of a reference signal successively shifted in time with respect to one another.

8. An apparatus according to claim 5, wherein respective ones of said signal processing control codes are representative of quantized values of successive portions of N sinusoidal signals having respectively different frequencies, wherein N corresponds to the number of respective values of said input signal provided in digitally encoded format as the respective multibit digital codes stored, whereby, upon completion of the successive shifting of the contents thereof, for each respective multibit digital code, the contents of respective rows of controllable accumulators of said third means are effectively representative of the processing of said input signal in accordance with the discrete Fourier transform.

9. An apparatus according to claim 3, wherein said second means comprises means for storing said plurality of signal processing operation control codes and controllably coupling preselected portions thereof over said control code output lines to said array of repetitively configured controllable signal combining elements.

10. An apparatus according to claim 9, wherein said array of repetitively configured controllable signal combining elements comprises a matrix of elements respective rows of which are coupled to respective ones of said plurality of control code output lines and respective columns of which are coupled to respective bit lines of said multibit output link.

11. An apparatus according to claim 10, wherein each of said controllable signal combining elements comprises a controllable accumulator which controllably accumulates the data value of the bit line coupled thereto from said multibit output link in accordance with the data value of a prescribed portion of the control code coupled thereto over a respective one of said control code output lines.

12. An apparatus according to claim 1, further including fourth means for storing said multibit digital signal codes, and wherein said first means is coupled to receive said multibit digital signal codes from said fourth means.

13. An apparatus for carrying out a prescribed signal processing operation on input signals respective values of successive portions of which are provided in digitally encoded format as a sequence of multibit digital codes comprising:

shift register means, having a plurality of stages respectively coupled to a first multibit data coupling link over the bit lines of which the contents of said multibit digital codes are supplied, for controllably successively shifting the contents of the stages thereof by a prescribed number of bits and providing each resulting shifted code over respective bit lines of a second multibit data coupling link;

control code generating means, having a plurality of control code output lines for generating a plurality of signal processing operation control codes and supplying respective ones thereof over respective ones of said control code output lines; and an array of controlled signal combining means, coupled to said second multibit data coupling link and to said control code output lines, for controllably generating a plurality of digital output codes in accordance with a predetermined relationship between the contents of the shifted codes provided over the respective bit lines of said second multibit data coupling link and the contents of respective ones of said signal processing operation control codes.

14. An apparatus according to claim 13, wherein said array comprises an array of repetitively configured controllable signal combining elements each of which is coupled to one of the respective bit lines of said second multibit data coupling link and is coupled to receive one of the signal processing operation control codes generated by said control code generating means.

15. An apparatus according to claim 14, wherein said array of repetitively configured controllable signal combining elements comprises a matrix of elements respective rows of which are coupled to respective ones of said plurality of control code output lines and respective columns of which are coupled to respective bit lines of said second multibit data coupling link.

16. An apparatus according to claim 15, wherein each of said controllable signal combining elements comprises a controllable accumulator which controllably accumulates the data value of the bit line coupled thereto from said second multibit data coupling link in accordance with the data value of a prescribed portion of the control code coupled thereto over a respective one of said control code output lines.

17. An apparatus according to claim 16, wherein respective ones of said signal processing control codes are representative of quantized values of successive portions of a plurality of time varying signals.

18. An apparatus according to claim 16, wherein respective ones of signal signal processing codes are representative of quantized values of a reference signal successively shifted in time with respect to one another.

19. An apparatus according to claim 16, wherein respective ones of said signal processing control codes are representative of quantized values of successive portions of N sinusoidal signals having respectively different frequencies, wherein N corresponds to the number of successive values of said input signal provided in digitally encoded format as said successive multibit digital codes, whereby, upon completion of the successive shifting of the contents of said shift register means, for each respective multibit digital code, the contents of respective rows of controllable accumulators of said array are effectively representative of the processing of said input signal in accordance with the discrete Fourier transform.

20. An apparatus according to claim 14, wherein said control code generating means comprises means for storing said plurality of prescribed signal processing operation control codes and controllably coupling preselected portions thereof over said control code output lines to said array of repetitively configured controllable signal combining elements.

21. An apparatus according to claim 13, further including storage means for storing said sequence of multibit digital codes and supplying the contents of each respective code over said first multibit data coupling link to said shift register means.

22. A method for carrying out a prescribed signal processing operation on input signals respective values of which are provided in digitally encoded format as multibit digital signal codes comprising the steps of:
 (a) controllably shifting respective ones of said multibit digital signal codes by a prescribed number of bits and providing the resulting shifted codes over respective bit lines of a multibit data coupling link;
 (b) providing a plurality of signal processing operation control codes over respective ones of a plurality of control code output lines; and
 (c) generating a plurality of digital processing result codes in accordance with a relationship between the contents of the respective ones of said signal processing operation control codes and shifted multibit digital codes provided over said multibit data coupling link.

23. A method according to claim 22, wherein step (a) includes the step of storing, successively, respective ones of said multibit digital signal codes and controllably shifting each respective code successively by said prescribed number of bits and providing the code resulting from each successive shift to said multibit data coupling link.

24. A method according to claim 23, wherein step (c) is carried out in an array of repetitively configured controllable signal combining elements each of which is coupled to one of the respective bit lines of said multibit data coupling link and is coupled to receive one of the signal processing operation control codes generated in step (b).

25. A method according to claim 24, wherein step (b) comprises storing said plurality of signal processing operation control codes and controllably coupling preselected portions thereof over said control code output lines to said array of repetitively configured controllable signal combining elements.

26. A method according to claim 25, wherein respective ones of said signal processing control codes are representative of quantized values of successive portions of a plurality of time varying signals.

27. A method according to claim 25, wherein respective ones of signal signal processing codes are representative of quantized values of a reference signal successively shifted in time with respect to one another.

28. A method according to claim 25, wherein respective ones of said signal processing control codes are representative of quantized values of successive portions of N sinusoidal signals having respectively different frequencies, wherein N corresponds to the number of successive values of said input signal provided in digitally encoded format as said successive multibit digital codes.

29. A method according to claim 24, wherein said array of repetitively configured controllable signal combining elements comprises a matrix of elements respective rows of which are coupled to respective ones of said plurality of control code output lines and respective columns of which are coupled to respective bit lines of said multibit data coupling link.

30. A method according to claim 22, further including the step of (d), prior to step (a), storing said successive multibit digital signal codes.

* * * * *